United States Patent [19]
Walker et al.

[11] Patent Number: 5,949,641
[45] Date of Patent: Sep. 7, 1999

[54] MOUNTING ARRANGEMENT FOR NEUTRAL BUS IN SWITCHGEAR ASSEMBLY

[75] Inventors: Steven Dale Walker, Arden; William Edward Wilkie, II, Fletcher, both of N.C.

[73] Assignee: Eaton Corporation, Cleveland, Ohio

[21] Appl. No.: 09/188,735

[22] Filed: Nov. 9, 1998

[51] Int. Cl.[6] ...................................................... H02B 1/04
[52] U.S. Cl. .......................... 361/600; 361/605; 361/611; 361/652; 200/168 K; 200/50.01; 200/48 R; 174/70 B; 174/99 B; 174/73 R; 307/151; 307/147
[58] Field of Search ........................... 361/335, 336–337, 361/341, 342, 344, 345–361, 376, 429, 605–611, 600, 614, 652; 200/50.01, 50.02, 50 AA, 50 A, 48 R, 48 V, 48 SB, 144, 166 R, 168 K, 168 R; 174/70 B, 72 B, 99 B, 68.2, 149 B, 153 G, 156, 133 B, 174; 307/151, 147

[56] References Cited

U.S. PATENT DOCUMENTS

4,121,276  10/1978  Kovatch et al. ........................ 361/342
4,822,951   4/1989  Wilson et al. .......................... 174/68.2

*Primary Examiner*—Leo P. Picard
*Assistant Examiner*—Michael Datskovsky
*Attorney, Agent, or Firm*—Martin J. Moran

[57] ABSTRACT

The neutral cross bus in a switchgear assembly formed from two sets of side-by-side cabinets includes first and second neutral buses for the respective sets of cabinets. Each neutral bus is made up of a stack of flat conductors oriented horizontally in a main section extending across the cabinets of the set and vertically in a terminal section confronting the terminal section of the other neutral bus. The vertically oriented terminal sections are easily bolted together despite their limited accessibility when the two sets of cabinets are installed side-by-side. The flat conductors of the neutral cross bus are supported in their horizontal main sections by spaced supports formed by planar members with spaced horizontal slots set on edge and mounted by end flanges. The multiple flat conductors of neutral runbacks are interleaved with the flat conductors of the main sections of the cross bus and are supported by partitions having an opening sized to accommodate the maximum number of runback conductors with the remaining portion of the opening blocked by spacers interlocked with each other and the edges of the opening when less than the maximum number of flat runback conductors are used.

24 Claims, 7 Drawing Sheets

MOUNTING ARRANGEMENT FOR NEUTRAL BUS IN SWITCHGEAR ASSEMBLY

BACKGROUND OF THE INVENTION

1. Field of the Invention

This invention relates to switchgear assemblies for electric power distribution systems. More particularly, it relates to the neutral bus of such switchgear assemblies and arrangements for mounting such neutral bus within the cabinet of the assembly and connecting such neutral buses of adjacent units.

2. Background Information

Switchgear assemblies for electric power distribution systems include electrical apparatus housed in metal cabinets with associated conductors including bus bars and cabling for connecting the electrical apparatus in appropriate locations within the distribution system. Typically, the electrical apparatus includes switching devices such as circuit breakers or network protectors which provide protection, disconnect switches for isolating parts of the distribution system and transfer switches for connecting the distribution system to alternative power sources. The electrical apparatus can also include instrumentation such as metering equipment.

The associated conductors typically include a set of rigid multi-phase buses extending transversely through the cabinet. This set of rigid transverse buses usually includes a neutral bus, although in most installations in the United States the neutral is not switched.

Many installations require multiple cabinets arranged side by side, each with a transverse set of rigid buses. It is common to assemble several cabinets as a unit for shipping with a common set of buses extending transversely through the unit. Such practice requires that the set of transversely extending buses in adjacent units be connected in the field. As the rigid buses extend through the middle of each cabinet, it is not easy to make such connections, especially in the case of the neutral bus which is typically fabricated as a stack of elongated flat conductors set on edge and horizontally spaced. The splice connection between the neutral buses in adjoining units is made by a set of short sections of flat conductor interleaved between and secured to the two sets of flat conductors by bolts. This requires the manipulation of a number of small parts in restricted space.

The conductors provided within each cabinet include runbacks for the phase and neutral conductors which extend rearward into another compartment for connection to cabling forming a second set of buses to which the electrical apparatus is connected. The neutral runbacks are also fabricated as a stack of elongated, flat conductors set on edge and horizontally spaced which butt against the side of the rearmost conductor of the transverse neutral bus. Such a joint requires electrically conductive spacers between the flat conductors of the transverse bus and associated fasteners. Again, this requires manipulation of a number of small parts, although such joints are usually made during assembly at the factory.

There is room for improvement therefore in the neutral bus and its mountings within switchgear.

SUMMARY OF THE INVENTION

The present invention offers such improvements by providing a switchgear assembly which includes first and second sets of switchgear cabinets positioned side by side, a first neutral bus having a main section extending transversely through the first set of switchgear cabinets and a first terminal section transverse to the main section. Similarly, the second neutral bus has a main section extending transversely through the second set of switchgear cabinets and generally axially aligned with the main section of the first neutral bus. The second neutral bus also has a second terminal section transverse to its main section and confronting the terminal section of the first neutral bus. Fastener means secure the terminal sections of the two buses together in surface to surface contact. Preferably the terminal sections of the two neutral buses have aligned apertures and the fasteners comprise bolts extending through the apertures. In addition, the main sections of the neutral buses preferably extend horizontally and the terminal sections extend substantially vertically.

As a further aspect of the invention, the transverse neutral bus comprises a stacked plurality of elongated flat conductors. Preferably, the elongated flat conductors in the main sections of the neutral bus are spaced apart while they are in contact in the terminal sections. Again, preferably, the elongated flat conductors in the main sections are oriented in substantially horizontal planes while the flat conductors in the terminal section extends in substantially vertical planes.

In a particularly advantageous arrangement, the cabinets have forward, middle and rear compartments with the main sections of the neutral buses extending transversely through the middle compartments. At least one of the neutral buses includes in at least one of the compartments a neutral runback bus comprising a number of elongated flat conductors interleaved with and extending rearward toward the rear compartment from the main section.

As another aspect of the invention, the cabinets include a plurality of supports for the neutral buses each of which comprises a planar member having spaced apart slots through which the plurality of elongated flat conductors extend. Preferably, the planar members have terminal flanges for mounting them in spaced relation in the cabinets. With the elongated flat conductors of the main sections of the neutral buses oriented in horizontal planes, the planar members of the supports are oriented in vertical planes with the slots extending horizontally to support the flat conductors in vertically stacked, horizontal planes. Preferably, the planar members are electrically conductive but magnetically nonpermeable to minimize eddy current heating and the effects of the large magnetic forces generated by a short circuit. A suitable material for the planar members of the supports is stainless steel.

Partitions through which the stacked elongated flat conductors of the neutral bus extend comprise a planar part mounted substantially perpendicular to the neutral bus and having an opening sized to receive neutral buses with any number up to a predetermined number of flat conductors. The partition also includes removable spacers blocking off the opening around the elongated flat conductors. Spacers can be provided between the flat conductors of the neutral bus when spaced apart as well as between the conductors and the opening in the partition. In a preferred embodiment, the flat conductors have a selected thickness and the spacers have a width substantially equal to this thickness. The spacers are stackable to block the opening when the plurality of elongated flat conductors is less than the predetermined number. The spacers are made stackable by overlapping flanges extending along mating surfaces. Preferably, these overlapping flanges are provided by longitudinal tongues along one mating edge and a longitudinal groove along another mating edge. Also, preferably, the spacers engage the planar part adjacent the edges of the opening. This connection can be provided by a mounting tongue on one of the ends of the spacers and the edge of the opening, and a mounting groove on the other.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
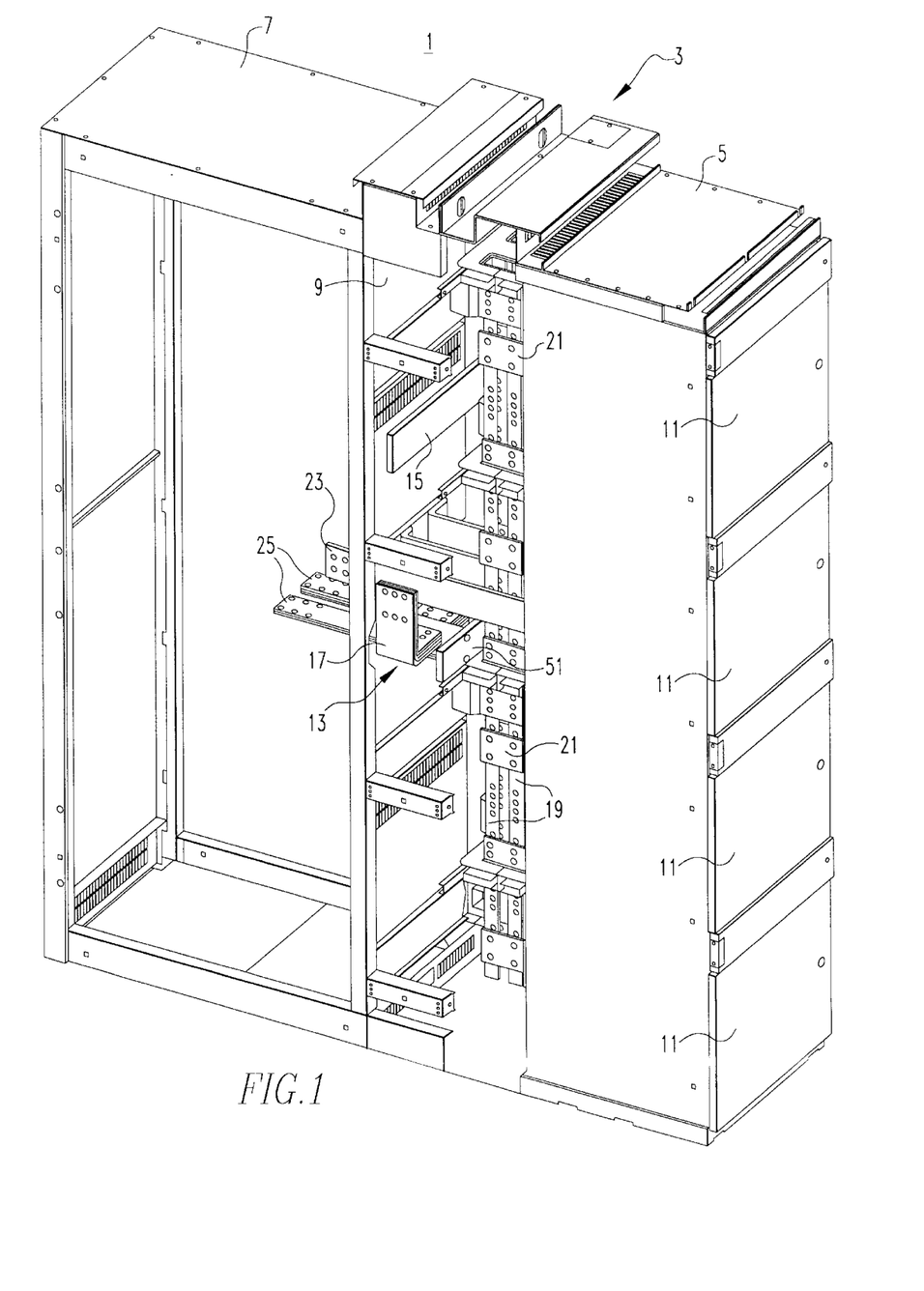
FIG. 1 is an isometric view of a piece of switchgear, with some parts removed for clarity, incorporating the invention.

FIG. 1 illustrates a piece of switchgear 1 incorporating the invention. This piece of switchgear 1 includes a metal cabinet 3 having a front compartment 5, a rear compartment 7 and a middle compartment 9. The front compartment houses electrical switching apparatus such as circuit breakers, network protectors, disconnect switches or transfer switches (not shown). In addition, instrumentation such as metering equipment (again, not shown) can also be housed in the front compartment 5. This electrical apparatus is housed in cells each of which has a front opening door 11.

The middle compartment 9 of the metal cabinet 3 houses a cross bus system 13 which includes phase buses 15 (only one shown) and a neutral bus 17. The phase buses 15 are connected (not shown) to a set of risers or vertical buses 19 which can be engaged by the electrical apparatus (not shown) in the front compartment 5 through stab conductors 21. The electrical apparatus is also connected to phase runbacks 23 which extend through the middle compartment 9 into the rear compartment 7. As the neutral is generally not switched in the United States, the neutral bus 17 is not connected to the electrical apparatus in the front compartment. However, the neutral bus 17 does have neutral runbacks 25 which extend into the rear compartment. The phase runbacks 23 and neutral runback 25 are connected in the rear compartment 7 to cabling (not shown) which forms feeder bus systems each with phase conductors and a neutral conductor.

Figure 2:
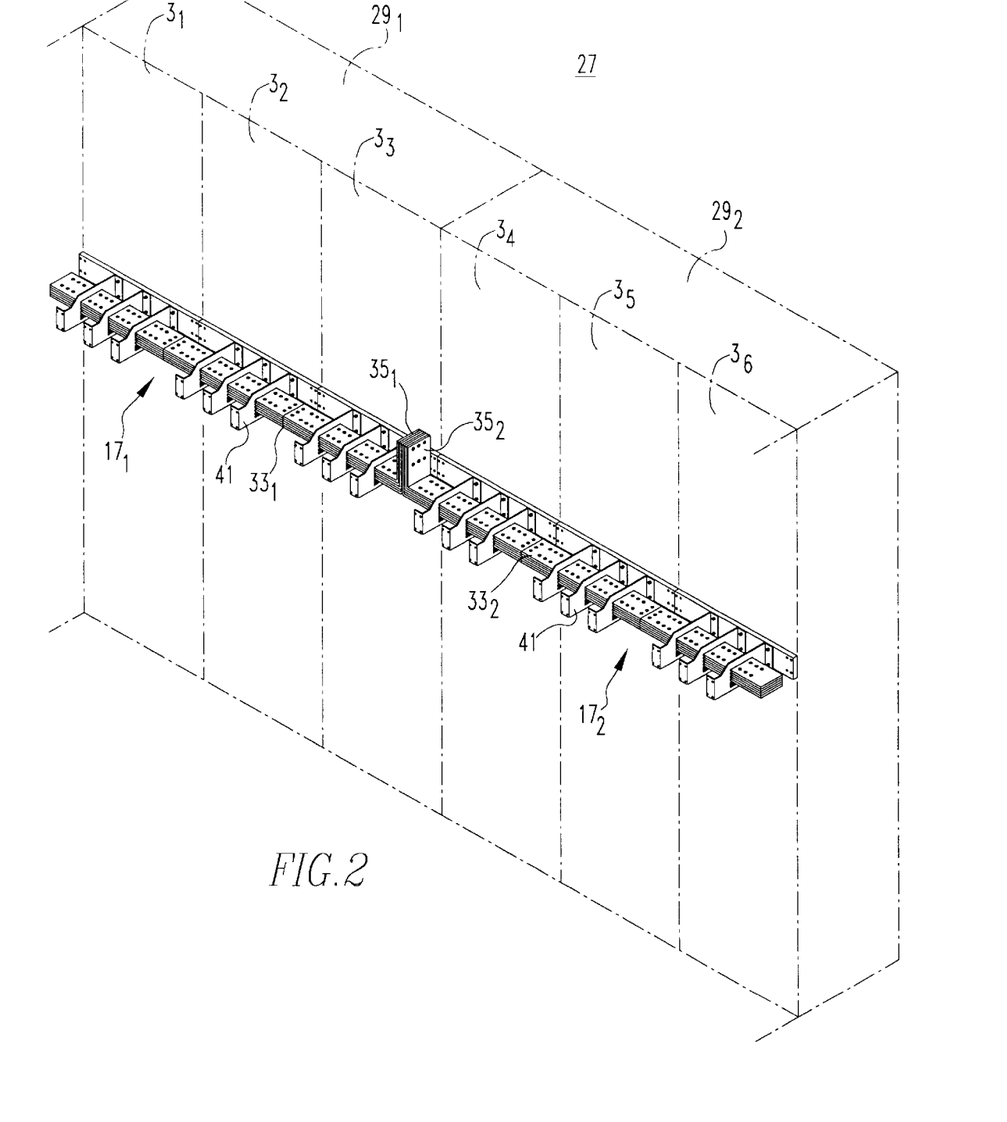
FIG. 2 is a partially schematic isometric view illustrating the switchgear assembly incorporating the neutral bus assembly in accordance with the invention.

Typically, multiple pieces of switchgear 1 shown in FIG. 1 are joined together to form a switchgear assembly 27 such as that shown in FIG. 2. This switchgear assembly 27 includes a first set $29_1$ of three of the switchgear cabinets $3_1$, $3_2$, and $3_3$ and a second set $29_2$ of the switchgear cabinets $3_4$, $3_5$, and $3_6$. While in the instant case the switchgear assembly 27 includes six cabinets, they are assembled in the factory as the two sets $29_1$ and $29_2$ of cabinets which are shipped to the field and then joined together to form the sixth cabinet assembly. Each set of three cabinets has a neutral bus $17_1$ and $17_2$ extending across all three cabinets of the set $29_1$ and $29_2$. The first neutral bus $17_1$ of the first set $29_1$ and the second neutral bus $17_2$ of the second set $29_2$ of switchgear cabinets are then joined in the field to provide a common neutral bus for the assembly 27.

Figure 3:
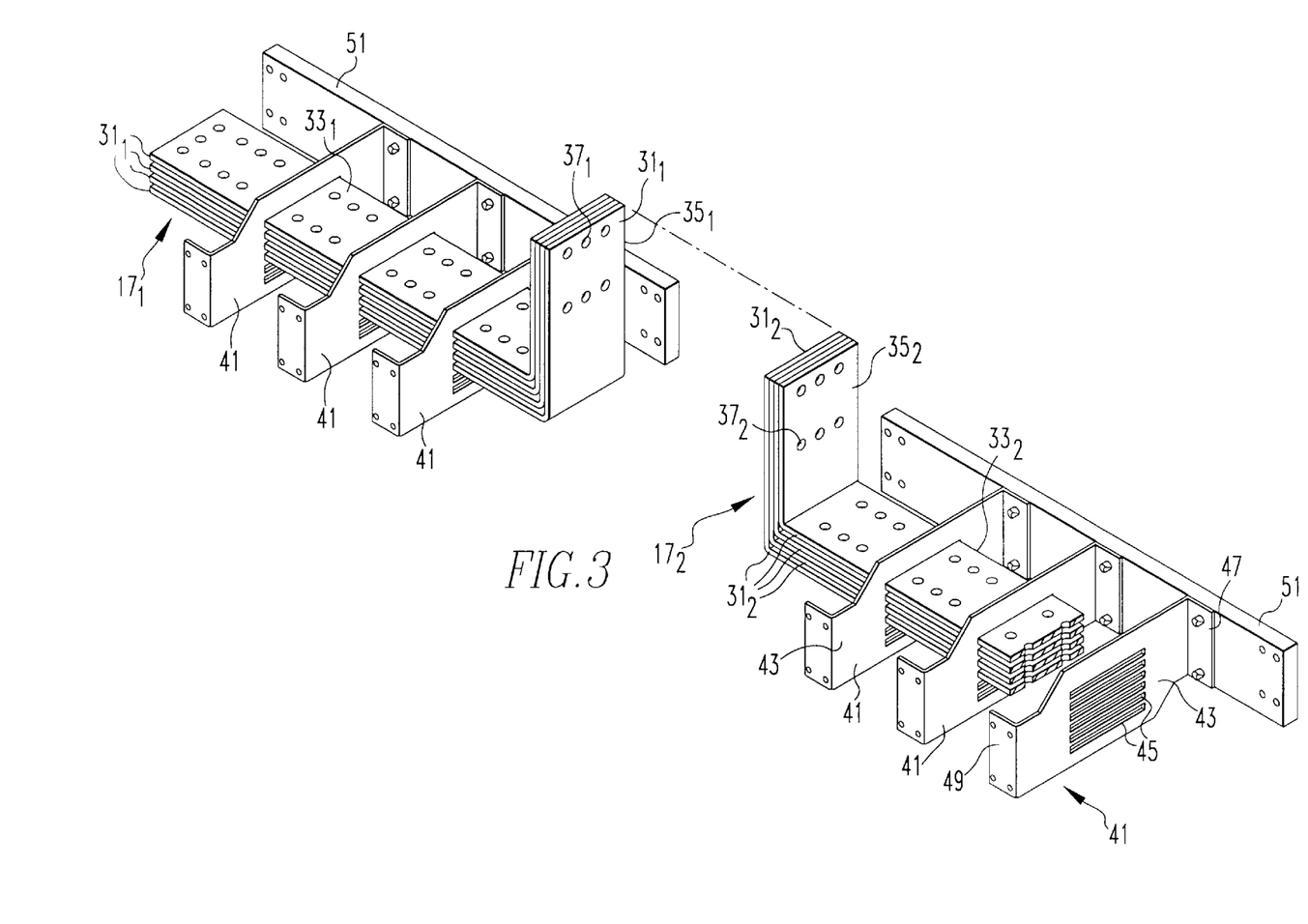
FIG. 3 is an isometric view in enlarged scale of a section of FIG. 2, illustrating neutral bus bars in accordance with the invention before connection.

Turning to FIG. 3, it can be seen that the first neutral bus $17_1$ is assembled from a plurality, in the example four, flat conductors $31_1$. In the main section $33_1$ of the neutral bus $17_1$ the flat conductors $31_1$ are oriented in horizontal planes and stacked vertically. The bus $17_1$ has a terminal section $35_1$ which extends transversely to the main section $33_1$ and therefore is oriented vertically. In the terminal section $35_1$ the conductors $31_1$ are in contact with one another.

The second neutral bus $17_2$ is also formed from a stack flat conductors $31_2$ which in a main section $33_2$ are oriented horizontally and spaced apart vertically, and which in a transversely extending terminal section $35_2$ extend vertically and are in contact with one another.

Figure 4:
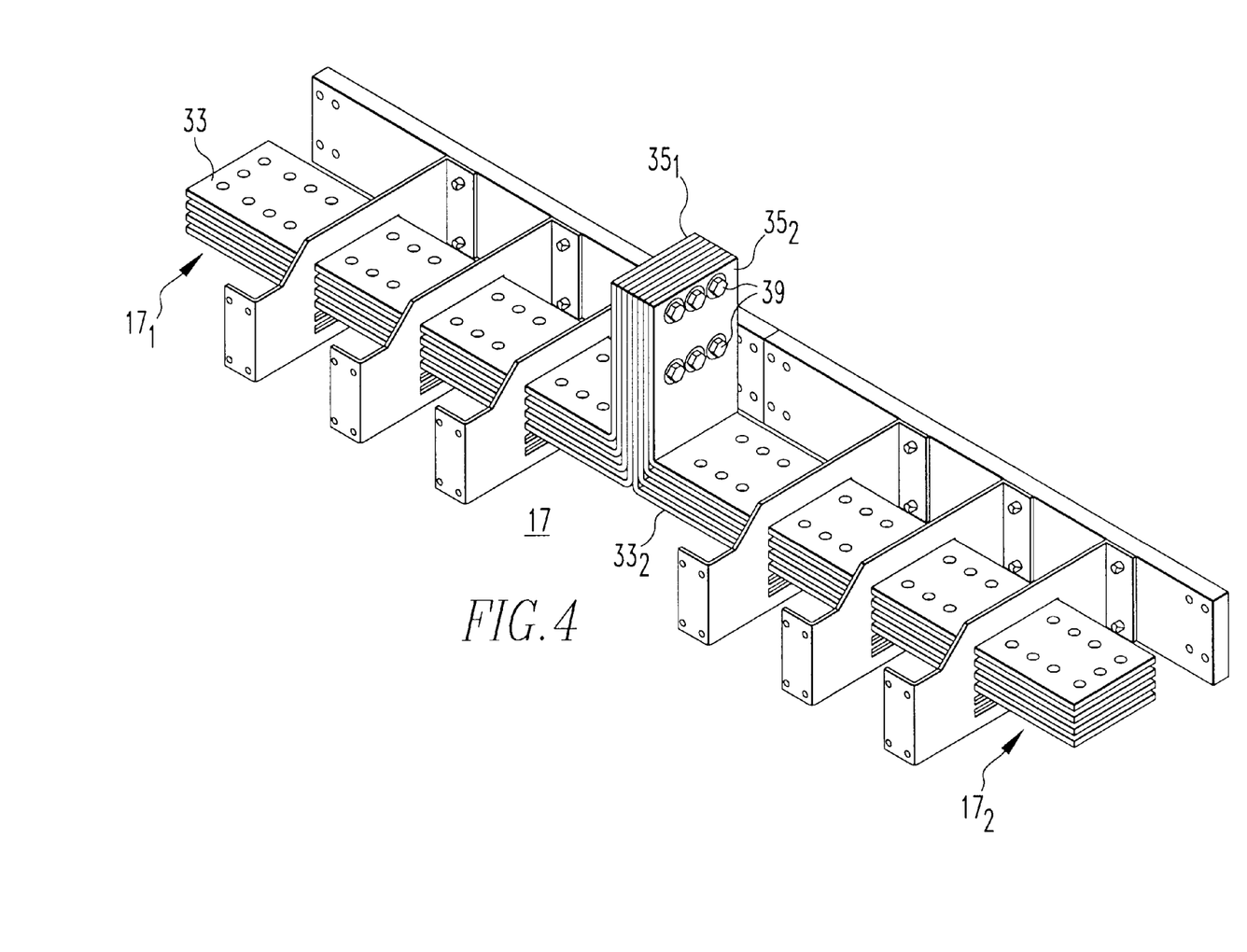
FIG. 4 is an isometric view similar to that of FIG. 3 illustrating connection of the adjoining neutral bus bars in accordance with the invention.

In the field, the two sets $29_1$ and $29_2$ of three switchgear cabinets 3 each are positioned side-by-side with the main sections $33_1$ and $33_2$ of the neutral bus bars $17_1$ and $17_2$ in longitudinal alignment. This brings the confronting terminal portions $35_1$ and $35_2$ into surface to surface contact as shown in FIG. 4. The terminal sections $35_1$ and $35_2$ have a number of aligned apertures $37_1$ and $37_2$ through which fasteners such as the bolts 39 are passed to clamp the terminal sections $35_1$ and $35_2$ together to form a common neutral bus 17 for the switchgear assembly 27. In the exemplary switchgear assembly 27, the terminal portions 35 extend vertically upward from the main sections 33. However, these terminal sections 35 could also extend vertically downward from the main sections 33. Typically, the common neutral bus 17 is connected to an external bus system (not shown) only at one end, for instance, the left end as shown in the exemplary embodiment of FIG. 2. The other end, the right end in FIG. 2, is terminated within the cabinet $3_6$.

Figure 5:
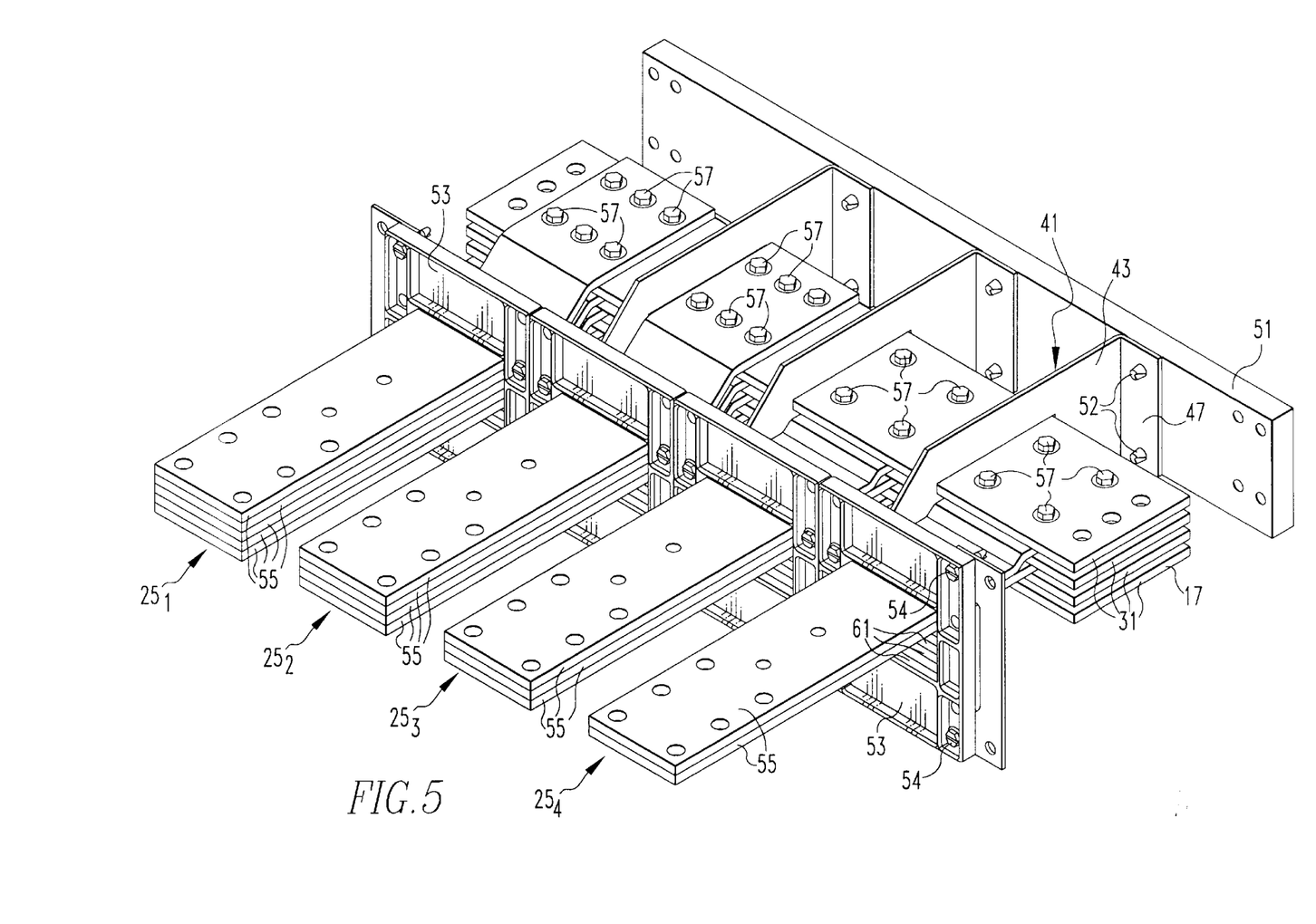
FIG. 5 is an isometric view illustrating a neutral bus bar in accordance with the invention incorporating runbacks and partitions in accordance with another aspect of the invention through which the runbacks extend.

The flat conductors 31 are supported and fixed in spaced vertical alignment by a number of neutral bus supports 41 spaced along the neutral bus 17 in each compartment. As best seen from the far right of FIG. 3, each neutral bus support 41 includes a vertically oriented planar member 43 having spaced apart horizontal slots 45, one for each flat conductor 31. Mounting flanges 47 and 49 are provided on the ends of the planar member 43. The forward flanges 47 are secured to a cross-member 51 in the cabinet 3 by fasteners such as screws 52. The rear flanges 49 are secured to partitions 53 (by fasteners 54) which also serve as barriers between the middle compartment 9 and rear compartment 7 through which the neutral runbacks 25 extend. As best seen in FIG. 5, the neutral runbacks 25 are also formed as a stack of flat conductors 55. The neutral runbacks 25 are substantially perpendicular to the neutral cross bus 17 and are easily connected therewith by interleaving of the flat conductors 55 and 31. The number of flat conductors 55 in the runbacks $25_1$–$25_4$ depend upon the requirements of the feeder circuit of which they are a part. For exemplary purposes only, it is shown in FIG. 5 that the neutral runbacks $25_1$–$25_4$ have five, four, three and two flat conductors 55, respectively. Whatever the number of conductors 55, they are secured to the conductors 31 by bolts 57. As will be noticed, the flat conductors 55 of the neutral runbacks are not spaced apart along their length but are offset by bends adjacent the cross bus 17 for interleaving between the spaced apart conductors 31. Alternatively, the conductors 55 of the runbacks 25 can remain spaced apart as they extend into the rear compartment 7.

Figure 6:
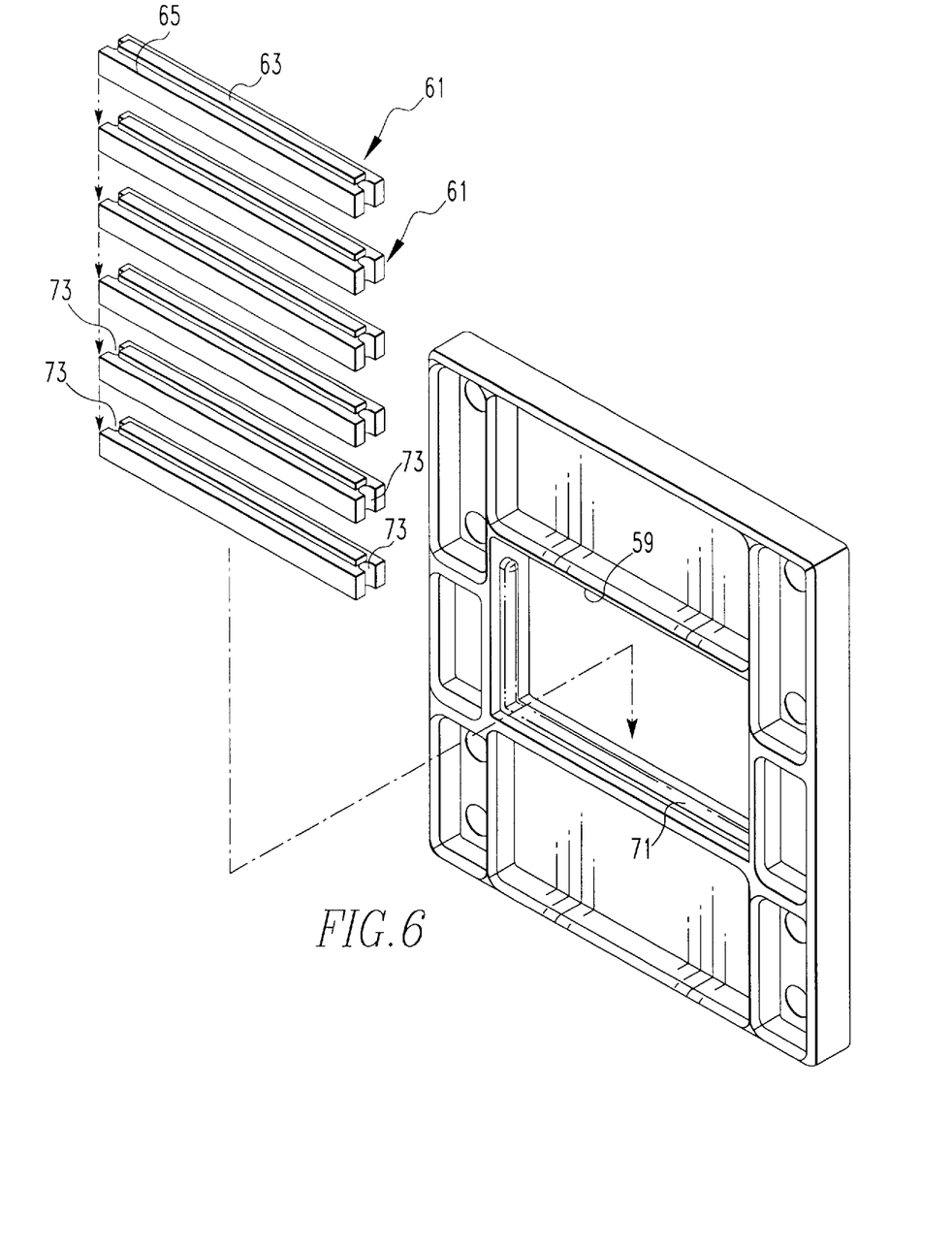
FIG. 6 is an exploded isometric view illustrating features of the partition shown in FIG. 5.

As mentioned, the partitions 53 support the neutral runbacks 25 and also form a barrier between the middle and rear compartments 9, 7. In order to accommodate the variations in the number of flat conductors 55 in the neutral runbacks 25, and yet provide an effective barrier, the partitions 53 have a through opening 59 (see FIGS. 5 and 6) which is sized to accommodate up to the predetermined maximum number of the flat conductors 55. For neutral runbacks 25 having less than this predetermined number of flat conductors, removable spacers 61 are provided to block off the unused portion of the through opening 59. Preferably, the spacers 61 are vertically sized to be substantially equal to the thickness of the flat conductors 55 such that they replace the flat conductors 55 on a one-to-one basis.

Figure 7:
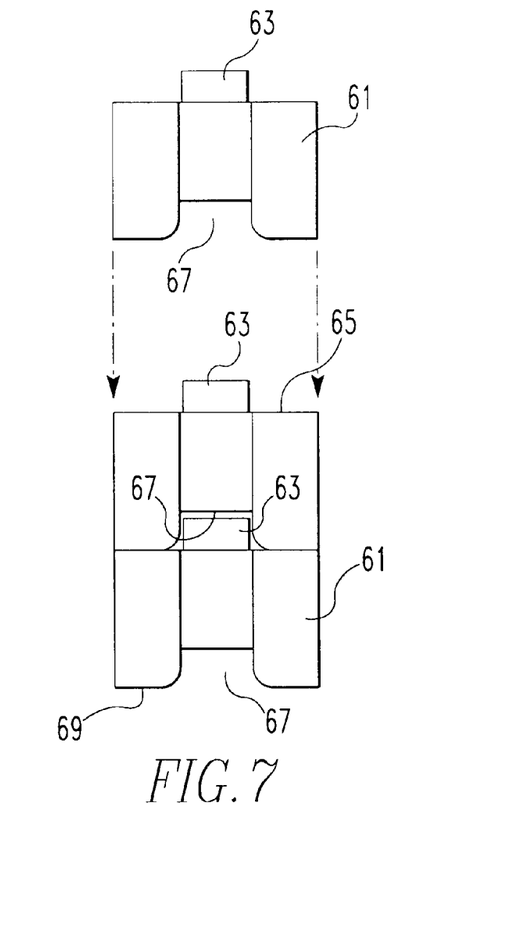
FIG. 7 is an end elevation view illustrating interlocking of the spacers illustrated in FIG. 6.

The spacers 61 are made stackable by overlappable flanges including the flanges 63 which form a longitudinally extending tongue 63 extending along a top mating surface 65 and a downwardly extending pair of flanges which form a longitudinally extending groove 67 on a bottom mating surface 69. As illustrated in FIG. 7, the longitudinally extending tongue 63 and groove 67 mate to stack the spacers 61.

Figure 8:
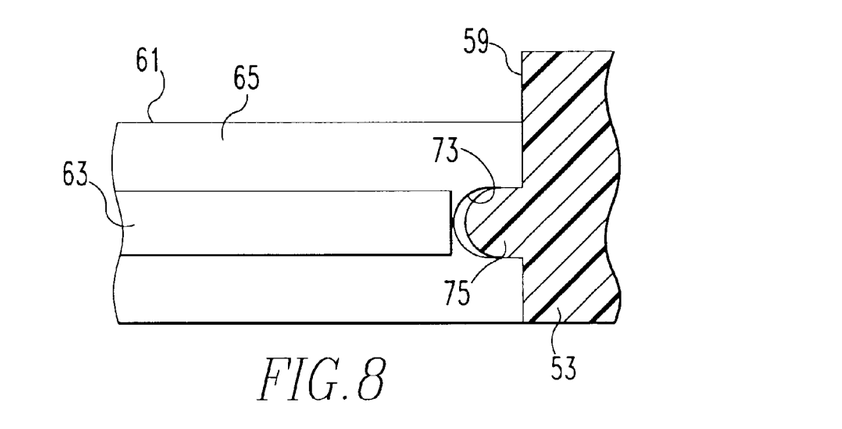
FIG. 8 is a fractional horizontal section illustrating the interconnection of the spacers with the partition.

The spacers 61 are secured within the partition 53 by a horizontally extending tongue 71 at the bottom of the through opening 59 which engages the groove 67 in the bottom surface 69 of the bottom spacer 61. In addition, the spacers 61 have vertically extending grooves 73 at each end which slide onto and engage vertically extending tongues 75 on the side surfaces of the through opening 59. Alternatively, the spacer 61 could have vertically oriented tongues at each end which would engage vertically oriented grooves in the sidewalls of the opening 59. Also, if the flat conductors 55 of the neutral runbacks 25 remain spaced apart throughout their length, the spacers could be sized to extend between each of the spaced apart flat conductors 55.

The neutral bus supports 41 for the neutral bus bar 17 can be fabricated from electrical conductive sheet material as the positions 41 and cross members 51 on which the supports 41 are mounted are electronically insulative. Preferably, this sheet material has a low magnetic permeability to minimize eddy currents and the effects of the magnetic flux generated by the high currents of short circuits. A suitable material is stainless steel.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A switchgear assembly comprising:
    first and second sets of switchgear cabinets positioned side-by-side;
    a first neutral bus having a first main section extending transversely through said first set of switchgear cabinets and having a first terminal section transverse to said first main section;
    a second neutral bus having a second main section extending transversely through said second set of switchgear cabinets and substantially axially aligned with said first main section, said second neutral bus having a second terminal section transverse to said second main section and facing said first terminal section; and
    fastener means securing said first terminal section and second terminal section in surface to surface contact.

2. The switchgear assembly of claim 1 wherein said first neutral bus and said second neutral bus each comprise a stacked plurality of elongated flat conductors.

3. The switchgear assembly of claim 2 wherein said elongated flat conductors of said first and second neutral buses are spaced apart in said main sections and in contact in said terminal sections.

4. The switchgear assembly of claim 3 wherein said elongated flat conductors are oriented in substantially horizontal planes in said main sections of said first and second neutral buses and in substantially vertical planes in said terminal sections of said first and second buses.

5. The switchgear assembly of claim 4 wherein said first and second sets of cabinets have forward, rear and middle compartments and said main sections of said first and second neutral buses extend transversely through said middle compartments, at least one of said first and second neutral buses in at least one of said cabinets, including a runback section comprising a number of elongated flat conductors interleaved with and extending rearward toward said rear compartment from said elongated flat conductors in said main section.

6. The switchgear assembly of claim 2 wherein said cabinets include a plurality of supports for said first and second neutral buses each comprising a planar member having spaced apart slots through which said elongated flat conductors of said main sections extend to fix said main sections in spaced relation.

7. The switchgear assembly of claim 6 wherein said planar members have terminal flanges for mounting said planar members in spaced relation.

8. The switchgear assembly of claim 7 wherein said elongated flat conductors in said main sections of said first and second neutral buses are oriented in horizontal planes and said planar members are oriented in vertical planes with said slots extending horizontally.

9. The switchgear assembly of claim 1 wherein said first and second terminal sections have aligned apertures and said fastener means comprise bolts extending through said aligned apertures.

10. The switchgear assembly of claim 1 wherein said main sections of said first and second neutral buses extend substantially horizontally through said first and second sets of cabinets, and wherein said terminal sections of the said first and second neutral buses extend substantially vertically.

11. A switchgear assembly comprising:
    a cabinet;
    a transverse neutral bus comprising a stacked plurality of up to a predetermined number of elongated flat conductors;
    a plurality of neutral bus supports spaced along said neutral bus and each comprising a planar member with said predetermined number of spaced parallel slots in which said plurality of elongated flat conductors are supported in spaced relation; and
    mounting means mounting said planar members in said cabinet.

12. The switchgear assembly of claim 11 wherein said mounting means comprises means mounting said planar members in vertical planes with said slots extending horizontally to support said elongated flat conductors in vertically stacked, horizontal planes.

13. The switchgear assembly of claim 12 wherein said planar members are electrically conductive but isolated from ground.

14. The switchgear assembly of claim 13 wherein said planar members are stainless steel.

15. The switchgear assembly of claim 13 wherein said mounting means comprises integral flanges on ends of said planar members, and fasteners securing said flanges to said cabinet.

16. The switchgear assembly of claim 15 wherein said planar members are magnetically nonpermeable.

17. A switchgear assembly comprising:
   a cabinet;
   a neutral bus mounted in said cabinet and comprising a stacked plurality up to a predetermined number of elongated flat conductors, a partition mounted substantially perpendicular to said neutral bus and having an opening sized to receive said neutral bus having up to said predetermined number of flat conductors, and removable spacers mounted in said opening blocking off said opening around said elongated flat conductors.

18. The switchgear assembly of claim 17 wherein said elongated flat conductors have a selected thickness and said spacers have a height substantially equal to said selected thickness.

19. The switchgear assembly of claim 17 wherein said spacers are stackable to block said opening when said plurality of elongated flat conductors is less than said predetermined number.

20. The switchgear assembly of claim 19 wherein said stackable spacers have overlapping flanges along mating surfaces.

21. The switchgear assembly of claim 20 wherein said overlapping flanges comprise longitudinal tongues extending along one mating surface and form longitudinal grooves extending along another mating surface.

22. The switchgear assembly of claim 21 wherein said spacers engage said partition adjacent edges of said opening.

23. The switchgear assembly of claim 22 wherein one of said spacers and said edges of said opening has a mounting tongue and the other of said spacers and edges of said opening has a mounting groove which is engaged by said mounting tongue.

24. The switchgear assembly of claim 17 wherein said elongated flat conductors are substantially equally spaced apart and said spacers include spacers between said spaced apart elongated flat conductors.

* * * * *